Patented June 1, 1937

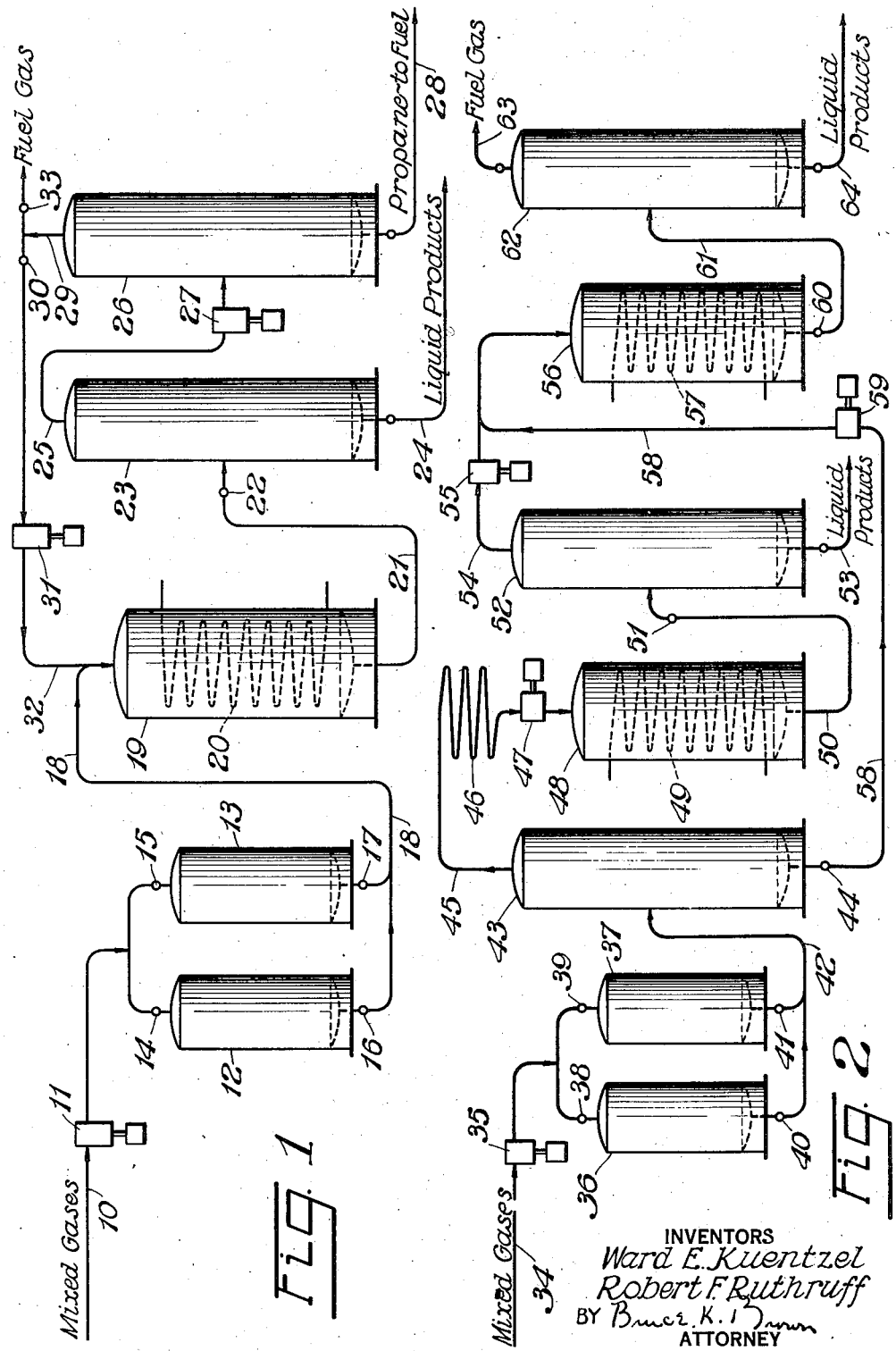

2,082,454

UNITED STATES PATENT OFFICE 2,082,454

POLYMERIZATION OF GASEOUS OLEFINS

Ward E. Kuentzel, Whiting, and Robert F. Ruthruff, Hammond, Ind., assignors to Standard Oil Company, Chicago, Ill., a corporation of Indiana Application December 28, 1934, Serial No. 759,474

8 Claims. (Cl. 196—10)

Our invention relates to an improved process for the catalytic polymerization of gaseous olefins to low boiling liquid hydrocarbons of the gasoline boiling range. More specifically we have discovered that while ethylene is not acted on by certain of the most advantageous catalysts, which catalysts will convert propylene or butylene to liquid products substantially completely and at high conversion rates, if the ethylene is admixed with certain quantities of heavier olefines such as propylene and/or butylene prior to catalytic treatment, the ethylene will be converted to a considerable extent and by recycling the ethylene fraction the conversion thereof can be carried substantially to completion. Still heavier olefin material may be used with the ethylene, such as cracked gasoline and unsaturated naphthas.

In a preferred form of our invention, we subject a mixture of ethylene and propylene, together ordinarily with certain quantities of ethane and propane and/or other inert gases, to catalytic treatment. The propylene is practically completely converted to liquids in one pass through the catalyst and the ethylene is partially converted. We separate liquid products, eliminate propane from the system, and recycle a large part of the ethylene-ethane fraction, while eliminating a sufficient part of the latter to prevent excessive amounts of ethane from building up in the system. On the other hand we may operate two successive steps of catalytic treatment adding fresh propylene to the ethylene fraction unconverted by the first treatment prior to passing it to the second catalytic treatment step.

We have found that there are various catalysts with which our improved process can advantageously be used, particularly catalysts of the aluminum halide stable double salt type as exemplified by sodium chloro-aluminate. Other examples of this class of catalyst are cuprous chloro-aluminate, calcium chloro-aluminate, lithium chloro-aluminate, silver chloro-aluminate, manganese, chloro-aluminate, cobalt, chloro-aluminate, mercury bromo-aluminate, antimony bromo aluminate, and also double salts of mixed character such as may be formed by addition of sodium chloride to aluminum bromide.

As a specific example of our process, sodium chloro aluminate at 350° F. and 750 lbs. per sq. in. pressure has essentially no action on ethylene but will essentially completely convert propylene (admixed or not with inert gases such as propane) to liquid products. Much higher temperatures are necessary to obtain any action on ethylene by itself, and for example even at 650° F. only 3.0% of ethylene is converted to liquid, whereas under these conditions the action on propylene at the same time of contact is so violent as to cause low yields of desired liquid products.

If, however, under the same conditions of 350° F. and 750 lbs. per sq. in. pressure we treat a mixture containing 19.1% ethylene by weight, 20.2% propylene by weight, and the balance propane, using sodium chloro-aluminate as a catalyst, we have found an overall conversion to liquids of 59.2% and 62.2% of the total olefins by weight, and analysis of the unconverted gases showed that 35.2% and 31.8% of the entering ethylene was converted in the two runs respectively, while 72.0% and 65.2% of the entering propylene was converted. Since the ethylene by itself would have shown zero conversion under these same conditions, the advantage of our process will be clear.

We may treat ethylene either in the presence of propylene or butylene or higher olefins or mixtures thereof as an "activator". Inert gases may, of course, be present such as ethane, propane, butane, hydrogen, nitrogen, etc. We find that it is preferable to have at least 50% by weight of the "activating" higher gaseous olefins present, based on the amount of ethylene present, in order to obtain the desired conversions.

The operation of our process will be understood from the foregoing general description and the following detailed description with reference to the drawing attached hereto and which forms part of this specification and in which:

Figure 1 is a diagrammatic elevational view of suitable apparatus for carrying out our process, and Figure 2 is a similar diagrammatic view of a two-stage system.

Referring to Figure 1 of the drawing, gases containing ethylene together with at least 50% by weight as much propylene and/or butylene, and ordinarily containing inert gases as well, enter through line 10 and are pumped by pump 11 through drier chambers 12 and 13 which are provided with valves 14, 15, 16, and 17 whereby one chamber may be replaced or recharged without interrupting the operation. The dry gases pass through line 18 to catalyst chamber 19 which may be of any convenient type and which may be provided with internal cooling coils 20. The catalyst used is of the aluminum halide stable double salt type as previously described. From chamber 19 the product and unconverted gases pass through line 21 and valve 22 to fractionator 23 from which gasoline and heavier liquid products are withdrawn through offtake 24 while unconverted gases pass overhead through line 25 to fractionator 26. Pump 27 in line 25 may be provided if it is desired to operate fractionator 26 at a higher pressure than fractionator 23. From the bottom of fractionator 26 through valved offtake 28 we withdraw propane, together with any butane not removed with the gasoline at offtake 24 from fractionator 23, and from the top of fractionator 26 through line 29 we remove a fraction containing any unconverted ethylene which will include 40%–65% of the ethylene originally introduced through line 10. We ordinarily recycle at least 50% of the gas removed through line 29 to the catalyst chamber 19 via valve 30 and pump 31 in line 32. The balance we eliminate through offtake 33 as fuel gas, in order to prevent ethane from building up excessively in the system.

The ratio between the amount recycled to the amount removed from the system will depend largely on the ratio of ethylene to ethane in the feed gas in line 10, and the greater the ratio of ethane to ethylene the greater must be the ratio of eliminated gas to recycled gas. If there is no ethane in the feed gas in line 10, and no other inert gases which cannot be readily separated from ethylene by fractionation, we recycle all of the gas from line 29 and secure essentially complete ultimate conversion of the ethylene. The greater the ethane content of the original gas, however, the lower the permissible amount of recycling and the lower the ultimate conversion of the ethylene.

Another modification of our process consists in operating in two successive stages on the ethylene fraction. Referring to Figure 2 the feed gas, of the same characteristics as previously described, enters through line 34 and is pumped by pump 35 through driers 36 and 37 which, as before described relative to driers 12 and 13 (Figure 1), are provided with valves 38, 39, 40, and 41. The dried gases or liquefied gases are passed through line 42 to fractionator 43 where part of the propylene and heavier constituents are withdrawn through the bottom outlet valve 44 while the ethylene fraction plus part of the propylene and heavier olefins is taken off through top offtake 45. It has been previously stated that we prefer to have at least 50% by weight of propylene and higher olefins based on the ethylene in this stream. This ethylene-propylene mixture in 45 is passed through condenser 46 and pump 47 into catalyst chamber 48 which as previously described may be of any convenient type and which may be provided with internal cooling means 49. Liquid products and unconverted gases are drawn off from chamber 48 through offtake line 50 and valve 51 and are passed into fractionator 52, wherein liquid products plus propane and butane are withdrawn by the bottom offtake 53 while ethylene unconverted in catalyst chamber 48, together with any ethane and other inert gases, is drawn off through line 54 and passed by pump 55 to catalyst chamber 56 which also may be provided with suitable internal cooling means 57. Prior to entering catalyst chamber 56 the ethylenic gas stream in line 54 is joined by the propane-propylene stream from fractionator 43 via valve 44, line 58 and pump 59, whereby the aforedescribed desired minimum amount of propylene (based on the ethylene) is restored prior to the entrance to catalyst chamber 56.

Following the second catalytic treatment in chamber 56 the gases and products are withdrawn through valve 60 in line 61 and pass to fractionator 62 from which unconverted gases are eliminated through valved offtake 63 while liquid products are removed through valved offtake 64.

It will be understood that the apparatus as described in the foregoing will be supplemented by various auxiliary devices in practice. For example, the fractionators 23, 26, 43, 52, and 62 will be provided with suitable bottom heating means and top cooling means, controls, etc. whereby proper operation is insured. Suitable preheaters ahead of the catalyst chambers 19, 48, and 56 may be used, and/or heat interchangers may be used for such purpose, or the incoming gases may be passed through the internal cooling means 20, 49, or 57.

We prefer to utilize as feed gas for our process a gas containing from 15% to 70% of olefins by volume. The desired ratio of propylene and/or heavier olefins to ethylene has been previously stated to be (minimum) 50% by weight of the ethylene. The catalysts of the preferred aluminum halide stable double salt type have been previously described. Our operating conditions for the catalytic conversion in the catalyst chambers 19, 48, and 56 may be in the range of temperatures of 150°–750° F., pressures of 200–3000 lbs. per sq. in. and flow rates of 400–24,000 cu. ft. of free entering gas (measured at 60° F. and atmospheric pressure) per cu. ft. of free catalyst volume per hour. Generally speaking, the rate of flow is proportional to the pressure, i. e. if with a given catalyst, temperature, and feed gas we use a flow rate of 8000 cu. ft./cu. ft./hr. at 200 lbs. per sq. in. pressure, we use a flow of 24,000 cu. ft./cu. ft./hr. with a pressure of 600 lbs. per sq. in., so that the time of contact with the catalyst remains approximately constant. Ordinarily, however, we prefer to operate on the range of 300–450° F. temperature, 500–1000 lbs. per sq. in. pressure, and rates of 2000–6000 cu. ft. of free entering gas per cu. ft. of free catalyst volume per hour.

The foregoing being a full and complete description of our invention, it is understood that we are not limited therein except as expressed in the claims as follows:

We claim:

1. The process of obtaining liquid products from a gas mixture containing ethylene together with higher gaseous olefins which comprises separating a part of the higher gaseous olefins to leave in the remaining gas at least 50% of higher gaseous olefins by weight of the ethylene, subjecting said remaining gas to catalytic polymerization, separating a gas fraction containing ethylene from the polymerization products and unconverted gases, admixing said fraction with the portion of higher gaseous olefins initially removed from the original feed gas, and subjecting said mixture to a second catalytic polymerization step.

2. In a process for polymerizing a gas mixture containing ethylene to liquid hydrocarbons, the steps comprising polymerizing ethylene in the presence of at least 50% of its weight of higher normally gaseous olefins with a catalyst comprising an aluminum halide stable double salt, at a temperature within the range of 300 to 750° F. and under a pressure within the range of 200 to 3000 lbs. per square inch, and separating polymerized hydrocarbon liquids from unconverted gases.

3. In a process for polymerizing a gas mixture containing ethylene to liquid hydrocarbons, the steps comprising polymerizing ethylene in the presence of at least 50% of its weight of higher normally gaseous olefins with a catalyst comprising an aluminum halide stable double salt, at a temperature of 300 to 450° F., under a pressure within the range of 500 to 3000 lbs. per square inch, and at flow rates of 2000 to 6000 cubic feet free entering gas per cubic feet of free catalyst volume per hour.

4. In a process for polymerizing a gas mixture containing ethylene to liquid hydrocarbons, the steps comprising polymerizing ethylene in the presence of at least 50% of its weight of higher normally gaseous olefins with a catalyst comprising an aluminum chloride stable double salt, at a temperature within the range of 300 to 750° F. and under a pressure within the range of 200 to 3000 lbs. per square inch, and separating polymerized hydrocarbon liquids from unconverted gases.

5. In a process for polymerizing a gas mixture containing ethylene to liquid hydrocarbons, the steps comprising polymerizing ethylene in the presence of at least 50% of its weight of higher normally gaseous olefins with a catalyst comprising sodium chloro-aluminate at a temperature within the range of 300 to 750° F. and under a pressure within the range of 200 to 3000 lbs. per square inch, and separating polymerized hydrocarbon liquids from unconverted gases.

6. In a process for polymerizing a gas mixture containing ethylene to liquid hydrocarbons, the steps comprising polymerizing ethylene in the presence of at least 50% of its weight of higher normally gaseous olefins with a catalyst comprising lithium chloro-aluminate at a temperature within the range of 300 to 750° F. and under a pressure within the range of 200 to 3000 lbs. per square inch, and separating polymerized hydrocarbon liquids from unconverted gases.

7. In a process for polymerizing a gas mixture containing ethylene to liquid hydrocarbons, the steps comprising polymerizing ethylene in the presence of at least 50% of its weight of higher normally gaseous olefins with a catalyst comprising magnesium chloro-aluminate at a temperature within the range of 300 to 750° F. and under a pressure within the range of 200 to 3000 lbs. per square inch, and separating polymerized hydrocarbon liquids from unconverted gases.

8. In a process for polymerizing a gas mixture containing ethylene to liquid hydrocarbons, the steps comprising polymerizing ethylene in the presence of at least 50% of its weight of higher normally gaseous olefins with a catalyst comprising sodium chloro-aluminate, at a temperature within the range of 300 to 750° F. and under a pressure within the range of 200 to 3000 lbs. per square inch, separating polymerized hydrocarbon liquids from unconverted gases, separating from the unconverted gases a fraction containing ethylene and recycling said fraction to the catalytic polymerization step.

WARD E. KUENTZEL.
ROBERT F. RUTHRUFF.